(12) United States Patent
Ando

(10) Patent No.: US 9,667,567 B2
(45) Date of Patent: May 30, 2017

(54) RELAY DEVICE

(71) Applicant: Hitachi Metals, Ltd., Minato-ku, Tokyo (JP)

(72) Inventor: Yuta Ando, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 166 days.

(21) Appl. No.: 14/529,339

(22) Filed: Oct. 31, 2014

(65) Prior Publication Data

US 2015/0163112 A1 Jun. 11, 2015

(30) Foreign Application Priority Data

Dec. 9, 2013 (JP) ................................. 2013-254532

(51) Int. Cl.
*H04L 1/00* (2006.01)
*H04L 12/947* (2013.01)
*H04L 12/26* (2006.01)

(52) U.S. Cl.
CPC .............. *H04L 49/25* (2013.01); *H04L 43/50* (2013.01)

(58) Field of Classification Search
CPC ......... H04L 43/50; H04L 49/25; H04L 49/55; H04L 49/557
See application file for complete search history.

(56) References Cited

U.S. PATENT DOCUMENTS

| | | | | |
|---|---|---|---|---|
| 6,975,587 B1 * | 12/2005 | Adamski | ............... | H04L 45/586 370/217 |
| 7,310,306 B1 * | 12/2007 | Cheriton | ................. | H04L 45/00 370/218 |
| 7,787,386 B1 * | 8/2010 | Marshall | ............. | H04L 12/2697 370/244 |
| 2006/0126495 A1 * | 6/2006 | Guichard | ............ | H04L 12/2697 370/216 |
| 2011/0113154 A1 | 5/2011 | Maruyama | | |
| 2012/0127853 A1 * | 5/2012 | Tatsumi | ................ | H04L 49/557 370/217 |
| 2013/0272113 A1 * | 10/2013 | Sawaguchi | ............. | H04L 45/28 370/218 |

FOREIGN PATENT DOCUMENTS

JP   2011-109167 A   6/2011

* cited by examiner

*Primary Examiner* — Shaq Taha
*Assistant Examiner* — Ryan Kavleski
(74) *Attorney, Agent, or Firm* — Crowell & Moring LLP

(57) ABSTRACT

A line card monitors communicability between itself and first to third fabric cards, and when there is abnormality in the communicability with the second fabric card, detects the abnormality and configures settings to switch a frame transmitted to the second fabric card so as to be directed to the third fabric card as a result of the detection of the abnormality within a first period. A communicability test unit generates a test frame at every second period, transmits the test frame to the fabric card selected by a path selection unit, and receives the test frame returned from the fabric card. The second period is longer than the first period, and the communicability test unit evaluates the presence or absence of a fault based on the reception results for the first and second test frames.

2 Claims, 10 Drawing Sheets

FIG. 10

RESULT EVALUATION PROCESS OF INTER-LC TEST

|  |  | TRANSMISSION CARD | | | | |
|---|---|---|---|---|---|---|
|  |  | LC[1] | LC[2] | LC[3] | ... | LC[m] |
| RECEIVED CARD | LC[1] | ■ | ○ | ○ | ... | ○ |
|  | LC[2] | × | ■ | ○ | ... | ○ |
|  | LC[3] | × | ○ | ■ | ... | ○ |
|  | ... | ... | ... | ... | ■ | ... |
|  | LC[m] | × | ○ | ○ | ... | ■ |

⇩

LC[1] FAULT (USER PATH SIDE)

RELAY DEVICE

CROSS-REFERENCE TO RELATED APPLICATION

The present application claims priority from Japanese Patent Application No. 2013-254532 filed on Dec. 9, 2013, the content of which is hereby incorporated by reference into this application.

TECHNICAL FIELD OF THE INVENTION

The present invention relates to a chassis-type relay device, and relates to, for example, a detection function of an internal fault in a relay device.

BACKGROUND OF THE INVENTION

For example, in the method described in Japanese Patent Application Laid-Open Publication No. 2011-109167 (Patent Document 1), in a communication device connected to a ring network, the communication state between the interface cards inside the device is monitored by an internal monitoring frame, and when the communication state is abnormal, a block point of the ring network is set to the corresponding interface card.

SUMMARY OF THE INVENTION

For example, a so-called chassis-type switching device (in other words, relay device) in which a plurality of line cards, fabric cards functioning to relay between the plurality of line cards and a management card which manages the respective cards are mounted in one chassis has been known. For example, in order to improve the availability and distribute the processing load, the switching device is sometimes configured to mount a plurality of fabric cards so as to enable the degraded operation or the alternative operation at the time of the occurrence of a fault.

The chassis-type switching device like this is desired to have various functions to detect the fault inside the device and take measures depending on the state of the fault. Examples of such functions include a fault-countermeasure function for fabric card and a fault-countermeasure function for line card. For example, the fault-countermeasure function for fabric card monitors the presence or absence of a fault in the fabric card, and when a fault is detected, it performs a switch process to give an operation to be originally done by the fabric card having the fault to another normal fabric card. Since the fault of a fabric card is a significant fault for a switching device, it is desired that the fault-countermeasure function for fabric card automatically performs the fault detection and the switch process of the fabric card at a high speed.

On the other hand, for example, the fault-countermeasure function for line card detects a fault of a line card and notifies information of the fault to outside or performs a process to restart that line card or the like. Since the fault of a line card is less significant than the fault of a fabric card, the fault-countermeasure function for line card may perform the fault detection of a line card at a speed lower than the fault detection of a fabric card. More specifically, when the fault detection is performed at a higher speed, the processing load and the occupancy of communication band are correspondingly increased, and it is thus beneficial that the fault detection is performed at a speed depending on the significance of the fault.

In order to detect the fault of a line card, for example, the fault-countermeasure function for line card performs a loop-back test using a test frame in the line card. In some cases, however, it is more desirable that the loop-back point of this loop-back test is set in a fabric card instead of a line card. In this case, the fault-countermeasure function for line card performs the loop-back test for all of the line cards, whereby the overall switching device including the line cards and the fabric cards can be efficiently and exhaustively tested. Furthermore, in the case of a switching device in which not only the frame relay between different line cards but also the frame relay within the same line card is performed through a fabric card, by setting the loop-back point of the loop-back test in a fabric card, the test consistent with the actual frame relay path can be performed readily.

In such a case, however, even when a fault is detected by the loop-back test, since the cause thereof can be present also in the fabric card, it is difficult for the fault-countermeasure function for line card to determine whether the fault is present in a line card. Note that the fault-countermeasure function for line card can know the occurrence of a fault in a fabric card through the fault-countermeasure function for fabric card described above. However, even when the fault-countermeasure function for line card knows the occurrence of a fault in a fabric card, the fault-countermeasure function for line card sometimes cannot determine the presence or absence of the fault in a line card because there is a possibility that a fault occurs also in a line card.

The present invention has been made in view of the problem mentioned above, and one object of the present invention is to improve the fault tolerance by improving the detection capability of an internal fault in a chassis-type switching device (relay device).

The above and other objects and novel characteristics of the present invention will be apparent from the description of the present specification and the accompanying drawings.

The following is a brief description of an outline of the typical embodiment of the invention disclosed in the present application.

The relay device according to the present embodiment includes: a plurality of line cards which communicates a frame with outside; and first and second fabric cards which relay a frame between the plurality of line cards. Each of the plurality of line cards has: an external port; a frame processing unit; a fabric path monitoring unit; a path selection unit; and a communicability test unit. When a frame is received at the external port, the frame processing unit learns an address table and retrieves a destination of the frame based on the address table. The fabric path monitoring unit monitors communicability between its own line card and the first and second fabric cards, and when there is abnormality in the communicability with the first fabric card, detects the abnormality and configures settings to switch a frame transmitted to the first fabric card so as to be directed to the second fabric card as a result of the detection of the abnormality within a first period. The path selection unit selects a fabric card based on the settings of the fabric path monitoring unit and transmits a frame to the selected fabric card. The communicability test unit generates a test frame at every second period, transmits the generated test frame to the fabric card selected by the path selection unit through the path selection unit, and receives the test frame returned from the fabric card. Here, the second period is longer than the first period, and the communicability test unit evaluates presence or absence of fault in its own line card based on a reception result for the test frame generated first and a reception result for the test frame generated second after an elapse of the second period.

The effects obtained by typical embodiments of the invention disclosed in the present application will be briefly described below. That is, it is possible to improve the fault tolerance by improving the detection capability of an internal fault in a chassis-type switching device (relay device).

BRIEF DESCRIPTIONS OF THE DRAWINGS

FIG. 10 is an explanatory drawing showing an example of a result evaluation process associated with the inter-line card test in FIG. 8.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof will be omitted.

First Embodiment

<<Schematic Configuration of Relay Device>>

Figure 1:
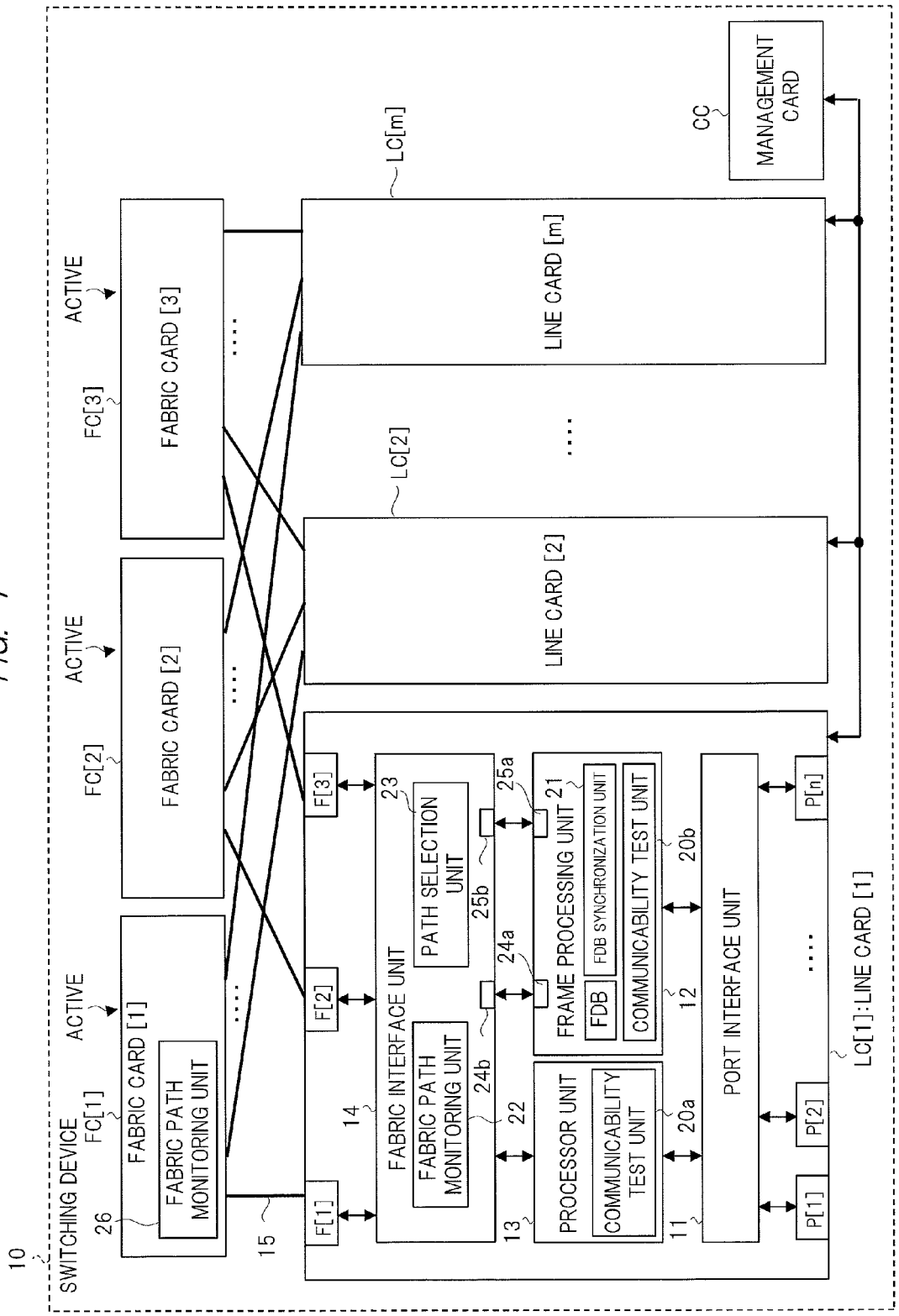
FIG. 1 is a schematic view showing a configuration example of a relay device according to the first embodiment of the present invention.

FIG. 1 is a schematic view showing a configuration example of a relay device according to the first embodiment of the present invention. A switching device (relay device) 10 shown in FIG. 1 is, for example, a chassis-type switching device in which a plurality of cards are mounted in one chassis. Concretely, the switching device 10 includes a plurality of (in this case, m) line cards LC[1] to LC[m], a plurality of (in this case, three) fabric cards FC[1] to FC[3] and a management card CC. Hereinafter, the m line cards LC[1] to LC[m] are collectively referred to as a line card LC and the plurality of fabric cards FC[1] to FC[3] are collectively referred to as a fabric card FC.

Each of the m line cards LC[1] to LC[m] communicates a frame with an outside of the device. Each of the three fabric cards FC[1] to FC[3] relays a frame between each of the m line cards LC[1] to LC[m]. The management card CC manages the m line cards LC[1] to LC[m]. Only one management card CC is shown here, but a plurality of management cards CC are provided in practice in order to improve the availability.

Each of the three fabric cards FC[1] to FC[3] is connected to each of the m line cards LC[1] to LC[m] through communication lines 15. More specifically, each of the three fabric cards FC[1] to FC[3] and each of the m line cards LC[1] to LC[m] are connected in a star topology. In the configuration in this case, the three fabric cards FC[1] to FC[3] are all active cards, and when a fault occurs in one of the fabric cards, the degraded operation by the remaining two fabric cards is possible.

Each of the m line cards LC[1] to LC[m] includes a plurality of (in this case, n) external ports P[1] to P[n], fabric card terminals F[1] to F[3], a port interface unit 11, a frame processing unit 12, a processor unit 13 and a fabric interface unit 14. The external ports P[1] to P[n] transmit a frame to the outside of the device and receive a frame from the outside of the device. Hereinafter, the external ports P[1] to P[n] are collectively referred to as an external port P. Each of the fabric card terminals F[1] to F[3] is connected to the fabric cards FC[1] to FC[3] through the communication lines 15.

The port interface unit 11 adds an identifier of the external port P which has received the frame to the frame received at the external ports P[1] to P[n], and then transmits the frame to the frame processing unit 12 or the processor unit 13. Also, the port interface unit 11 transmits a frame from the frame processing unit 12 or the processor unit 13 to a predetermined external port P selected from the external ports P[1] to P[n].

The fabric interface unit 14 includes a fabric path monitoring unit 22, a path selection unit 23, a user path terminal 24b and a learning path terminal 25b. The user path terminal 24b is a terminal for transmitting a frame used for the communication with the outside of the device (referred to as user frame in this specification). On the other hand, the learning path terminal 25b is a terminal for transmitting a learning frame (described later in detail) used only inside the device.

The fabric path monitoring unit 22 monitors the communicability between its own line card (for example, LC[1]) and each of the fabric cards FC[1] to FC[3] through the fabric card terminals F[1] to F[3]. Here, when there is an abnormality in the communicability with any one of fabric cards (first fabric card) serving as active cards, the fabric path monitoring unit 22 configures the settings to switch the frame transmitted to that card so as to be directed to another normal fabric card (second fabric card).

Concretely, when there is an abnormality in the communicability with the fabric card (first fabric card) FC[2], the fabric path monitoring unit 22 configures the settings to switch the fabric card terminal F[2] from a valid state to an invalid state. At this time, the fabric path monitoring unit 22 detects the abnormality in communicability and configures the settings to switch the fabric card FC[2] (fabric card terminal F[2]) from a valid state to an invalid state as a result of the detection of the abnormality within a predetermined period (first period).

The path selection unit 23 selects the fabric cards FC[1] to FC[3] (fabric card terminals F[1] to F[3]) based on the settings of the fabric path monitoring unit 22, and transmits the frame (that is, the user frame or the learning frame received at the user path terminal 24b or the learning path terminal 25b) to the selected fabric card. Also, the path selection unit 23 discriminates the frames received at the fabric card terminals F[1] to F[3], and transmits the frame to the user path terminal 24b when the frame is the user frame and transmits the frame to the learning path terminal 25b when the frame is the learning frame. Furthermore, the path selection unit 23 functions to relay the user frame between the processor unit 13 and the fabric card terminals F[1] to F[3].

In the example of FIG. 1, three fabric cards FC[1] to FC[3] are provided as active cards. The path selection unit 23 appropriately distributes the user frame or the learning frame received at the user path terminal 24b or the learning path terminal 25b to the three active cards based on a predetermined distribution rule, thereby distributing the loads of the fabric cards FC. At this time, if the fabric card FC[2] is switched from a valid state to an invalid state by the fabric path monitoring unit 22, the path selection unit 23 appropriately distributes the user frame or the learning frame to the fabric cards FC[1] and FC[3] serving as normal active cards.

The frame processing unit 12 includes an address table FDB, a communicability test unit 20b, a FDB synchronization unit 21, a user path terminal (first terminal) 24a and a learning path terminal (second terminal) 25a. The user path terminal 24a and the learning path terminal 25a are connected to the user path terminal 24b and the learning path terminal 25b of the fabric interface unit 14, respectively. More specifically, the user path terminal 24a and the learning path terminal 25a serve as the terminals connecting the frame processing unit 12 and the path selection unit 23 in the fabric interface unit 14.

In the address table FDB, the relation among the identifiers of the line cards LC[1] to LC[m], the identifiers of the external ports P[1] to P[n] and MAC (Media Access Control) addresses of the line card LC represented by each identifier and the terminal present ahead of the external port P represented by each identifier is registered. Though details thereof will be described later, the communicability test unit 20b generates a test frame and performs the communicability test by using the test frame. The FDB synchronization unit 21 generates a learning frame to reflect the update information of its own address table FDB on other line cards LC. Also, the FDB synchronization unit 21 updates its own address table FDB based on the learning frames generated by other line cards LC.

When the frame (that is, user frame) is received at the external ports P[1] to P[n], the frame processing unit 12 learns the address table FDB and retrieves the destination of the frame based on the address table FDB as the main operations thereof. Concretely, the frame processing unit 12 receives the user frame through the port interface unit 11, and learns the address table FDB by using the source MAC address contained in the user frame, the identifier of the external port P added by the port interface unit 11 and the identifier of its own line card LC. Also, the frame processing unit 12 retrieves the line card LC and the external port P corresponding to the destination MAC address contained in the user frame based on the address table FDB.

The processor unit 13 includes a communicability test unit 20a. Though details thereof will be described later, the communicability test unit 20a generates a test frame and performs the communicability test by using the test frame like the communicability test unit 20b in the frame processing unit 12 described above. The processor unit 13 performs software process to the user frame from the port interface unit 11 and the fabric interface unit 14 as the main operations thereof. More specifically, while the frame processing unit 12 performs the hardware process to the user frame, the processor unit 13 processes a frame, which is hard to be processed by hardware, such as a multicast frame by software.

Each of the fabric cards FC[1] to FC[3] includes a fabric path monitoring unit 26. The fabric path monitoring unit 26 monitors the communicability between its own fabric card (for example, FC[1]) and each of the line cards LC[1] to LC[m] together with the fabric path monitoring unit 22 in the fabric interface unit 14 described above. Also, when each of the fabric cards FC[1] to FC[3] receives the test frame generated by the communicability test units 20a and 20b described above, it transmits the test frame by return.

The example in which three fabric cards are provided has been described here, but the number of fabric cards does not have to be three, and it is also possible to provide two fabric cards or four or more fabric cards. Also, in the configuration example described here, only active cards are provided, but it is also possible to provide a standby card which gets into a valid state instead of the active card when a fault occurs in the active card. In this case, for example, one fabric card in two or more fabric cards is provided as a standby card, and the remaining one or more cards are provided as active cards. More specifically, any configuration is applicable as long as the degraded operation by the active card or the alternative operation by the standby card is possible with two or more fabric cards when a fault occurs.

<<Relay Process of User Frame>>

Figure 2:
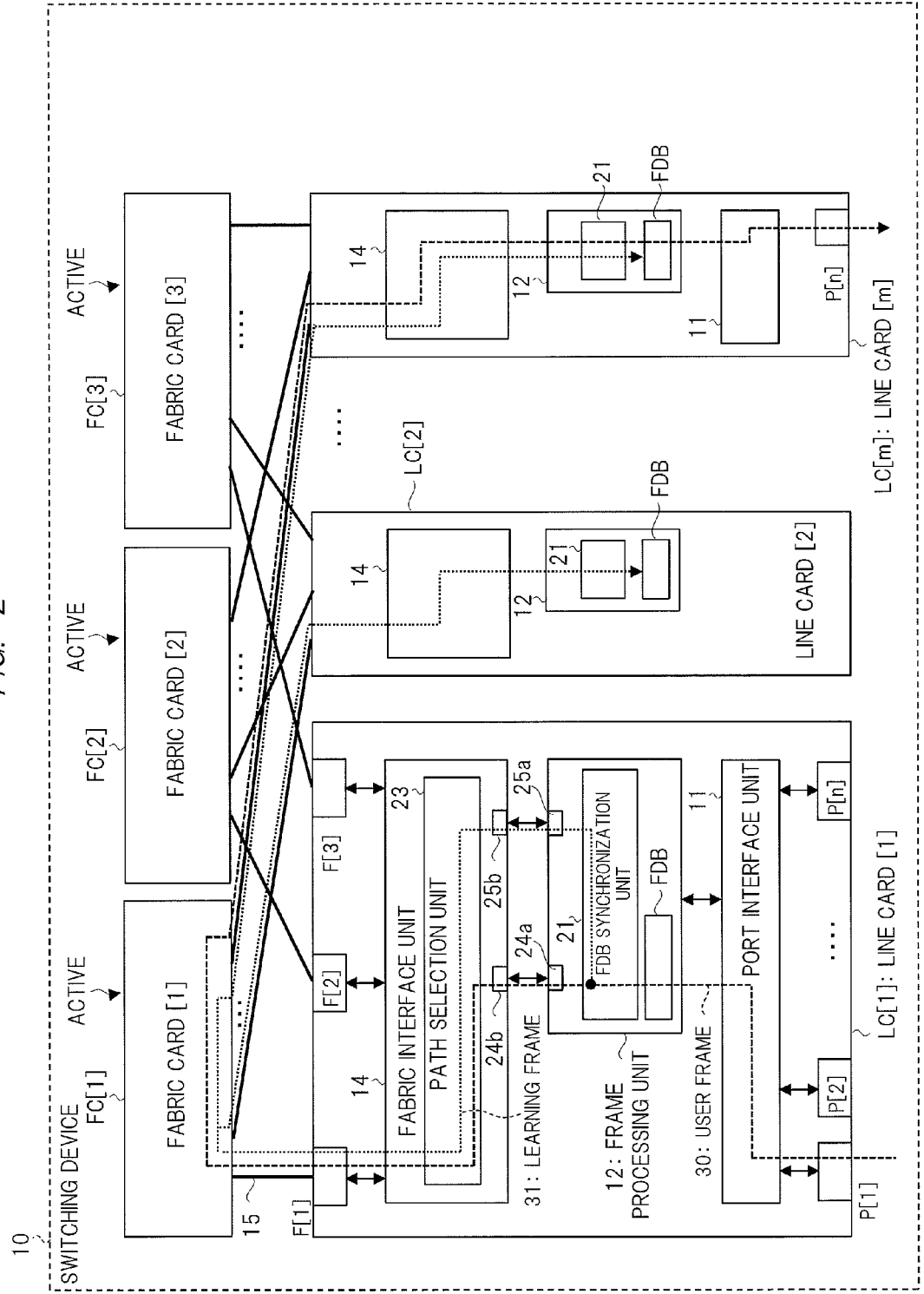
FIG. 2 is an explanatory drawing showing a schematic operation example at the time of relaying a user frame in the relay device of FIG. 1.

FIG. 2 is an explanatory drawing showing a schematic operation example at the time of relaying a user frame in the relay device of FIG. 1. FIG. 2 shows only related parts extracted from the configuration of FIG. 1 for the sake of convenience. Here, the case where the user frame received at the external port P[1] of the line card LC[1] is relayed to the external port P[n] of the line card LC[m] is assumed. First, the port interface unit 11 of the line card LC[1] adds an identifier of the external port [1] to the user frame 30 received at the external port P[1] and then transmits the user frame 30 to the frame processing unit 12.

The frame processing unit 12 updates (learns) the address table FDB by using the relation among the source MAC address contained in the user frame 30, the identifier of the external port P[1] added to the user frame 30 and its own line card LC[1]. Also, the frame processing unit 12 retrieves the address table FDB with using the destination MAC address contained in the user frame 30 as a retrieval key, thereby acquiring the identifier of the line card LC and the identifier of the external port P associated with the retrieval key. Here, it is presupposed that the identifier of the line card LC[m] and the identifier of the external port P[n] are associated with the retrieval key by the learning of the address table FDB in the past communications.

The frame processing unit 12 adds the identifier of the line card LC[m] and the identifier of the external port P[n] to the user frame 30, and transmits the user frame 30 to the user path terminal 24a. On the other hand, the FDB synchronization unit 21 in the frame processing unit 12 generates a learning frame 31 containing the source MAC address contained in the user frame 30, the identifier of the external port P[1] which has received the user frame 30 and the identifier of its own line card LC[1], and transmits the learning frame 31 to the learning path terminal 25a.

The path selection unit 23 transmits the user frame 30 received at the user path terminal 24b and the learning frame 31 received at the learning path terminal 25b to the fabric card FC. At this time, the path selection unit 23 selects which active cards (fabric cards FC[1] to FC[3]) the user frame 30 and the learning frame 31 are transmitted to based on a predetermined distribution rule. In this example, it is presupposed that the path selection unit 23 selects the path of the fabric card FC[1] for both of the user frame 30 and the learning frame 31.

The fabric card FC[1] transmits the user frame 30 to the line card LC[m] based on the identifier of the line card LC[m] added to the user frame 30 received through the line card LC[1]. Also, the fabric card FC[1] transmits the learning frame 31 received through the line card LC[1] to the line cards LC[2] to LC[m] other than the line card LC[1] serving as the source of the learning frame 31.

The port interface unit 11 of the line card LC[m] transmits the user frame 30 to the external port P[n] based on the identifier of the external port P[n] added to the user frame 30 received through the fabric card FC[1]. At this time, each identifier added to the user frame 30 is removed by the port interface unit 11.

Also, the FDB synchronization unit 21 of each of the line cards LC[2] to LC[m] updates (learns) the address table FDB of its own line card LC based on the learning frame 31 received through the fabric card FC[1]. Concretely, the FDB synchronization unit 21 updates (learns) the address table FDB by using the relation among the MAC address, the identifier of the line card LC[1] and the identifier of the external port P[1] contained in the learning frame 31.

<<Monitoring Process of Fabric Path>>

Figure 3:
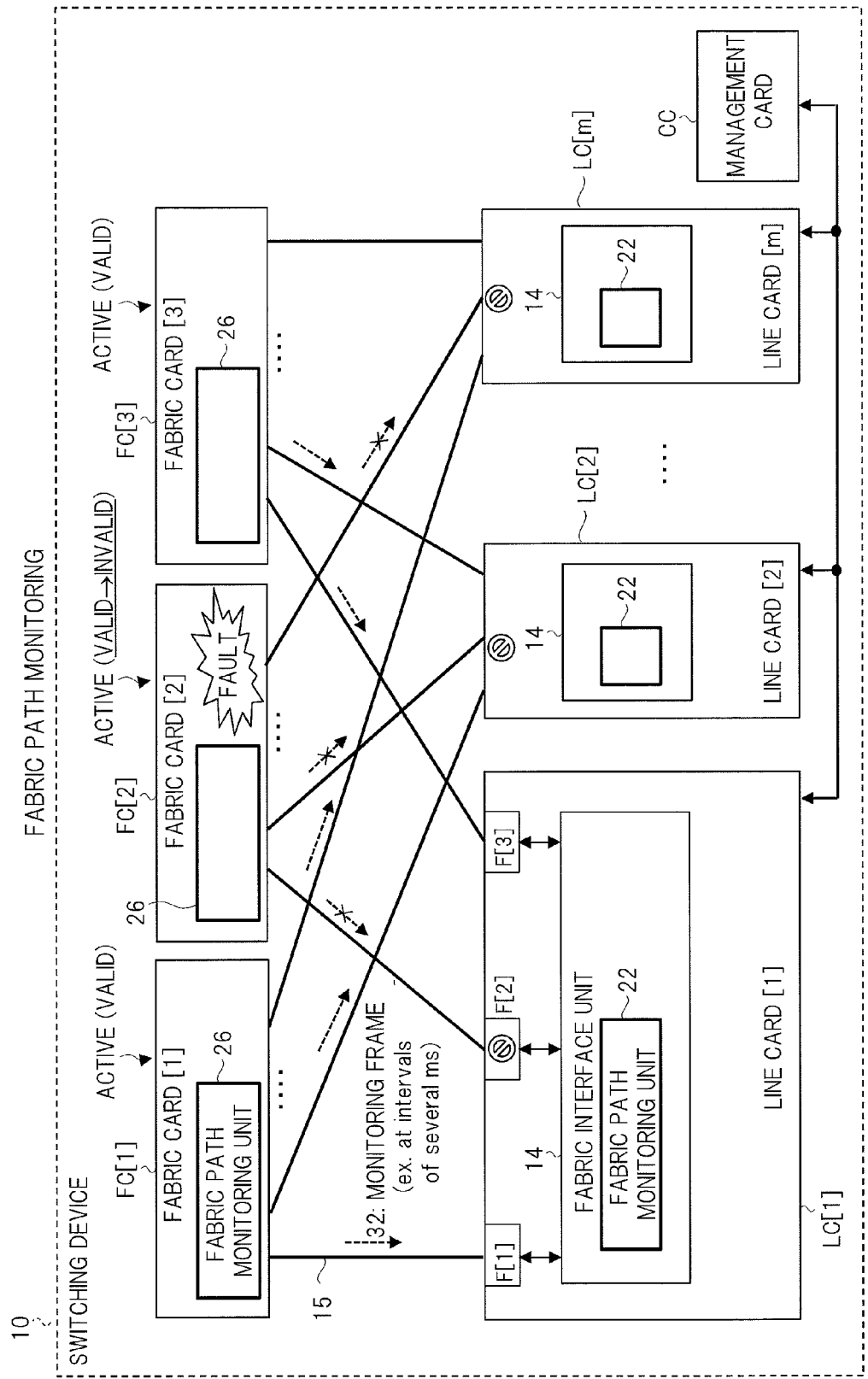
FIG. 3 is an explanatory drawing showing a schematic operation example of a fabric path monitoring unit in the relay device of FIG. 1.

FIG. 3 is an explanatory drawing showing a schematic operation example of a fabric path monitoring unit in the relay device of FIG. 1. FIG. 3 shows only related parts extracted from the configuration of FIG. 1 for the sake of convenience. In the example of FIG. 3, the fabric path monitoring unit 26 in each of the fabric cards FC[1] to FC[3] transmits a monitoring frame 32 to the respective line cards LC[1] to LC[m] at regular intervals (for example, every several ms).

The fabric path monitoring unit 22 in each of the line cards LC[1] to LC[m] receives the monitoring frame 32 through the respective fabric card terminals F[1] to F[3] at regular intervals (for example, every several ms), thereby monitoring the communicability between its own line card LC and each of the fabric cards FC[1] to FC[3]. Here, when the fabric path monitoring unit 22 cannot receive the monitoring frame 32 at any one of the fabric card terminals F[1] to F[3] within a predetermined period (for example, within a period 3.5 times as long as the transmission interval of the monitoring frame), the fabric path monitoring unit 22 determines that the fabric card FC corresponding to that fabric card terminal is abnormal.

For example, in the example of FIG. 3, a fault occurs in the fabric card FC[2], so that the fabric path monitoring unit 22 in each of the line cards LC[1] to LC[m] cannot receive the monitoring frame 32 within a predetermined period at the fabric card terminal F[2]. In this case, the fabric path monitoring unit 22 configures the settings to switch the fabric card FC[2] (fabric card terminal F[2]) from a valid state to an invalid state.

Here, the fabric path monitoring unit 22 detects the abnormality of the fabric card FC[2] (that is, the reception time-out of the monitoring frame 32) and configures the settings to switch the fabric card terminal F[3] to a valid state instead of the fabric card terminal F[2] as a result of the detection of the abnormality within a predetermined period (first period). The predetermined period (first period) is not particularly limited, but is, for example, several ten ms. Since the fault of the fabric card FC is a significant fault for the switching device 10, it is desired that the fault detection and the switch process of the fabric card are automatically performed at a high speed.

The monitoring method of the fabric path is not limited to that shown in FIG. 3, but various method are applicable as long as the detection of the abnormality of the fabric card FC and the resultant switch of the fabric card FC can be performed within a predetermined period (first period). For example, the method in which the fabric path monitoring unit 22 in the line card LC transmits a monitoring frame to the fabric path monitoring unit 26 in the fabric card FC and the fabric path monitoring unit 26 returns the monitoring frame to the fabric path monitoring unit 22 is also applicable.

Alternatively, the method in which a monitoring frame is transmitted and received between each of the fabric path monitoring units 22 in the line cards LC[1] to LC[m] through the respective fabric cards FC[1] to FC[3] is also applicable. In this case, for example, when the fabric path monitoring unit 22 of the line card LC[1] cannot receive the monitoring frame from any of other line cards LC[2] to LC[m] at the fabric card terminal F[2], the fabric path monitoring unit 22 can determine that the fabric card FC[2] is abnormal. Furthermore, the method in which the abnormality is detected in real time by using hardware such as a monitoring circuit to detect the intensity of a received signal is also applicable.

<<Intra-Line Card Test (Premise)>>

Figure 4:
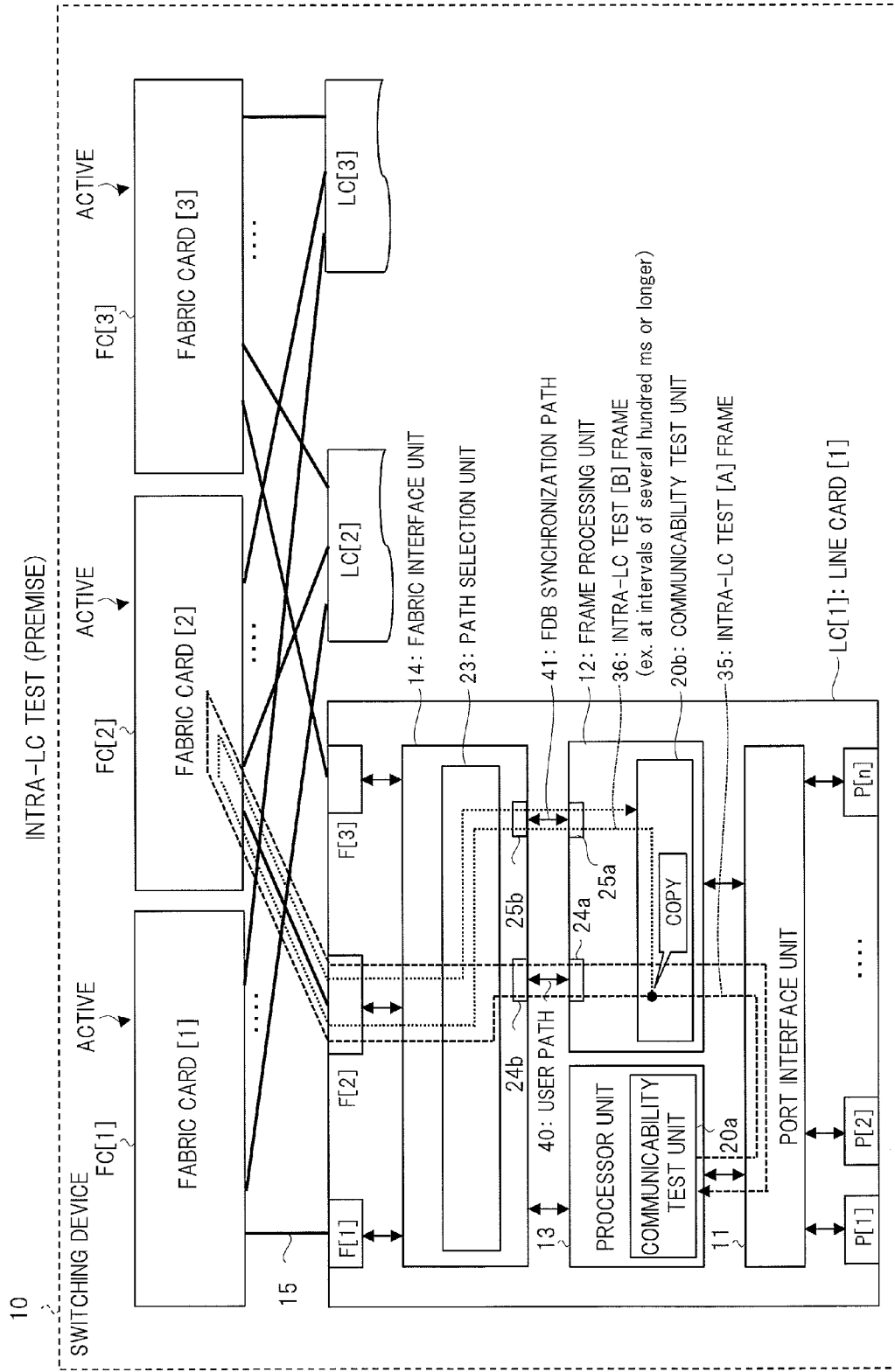
FIG. 4 is an explanatory drawing showing a schematic operation example to be a premise of a communicability test unit in the relay device of FIG. 1.

FIG. 4 is an explanatory drawing showing a schematic operation example to be a premise of a communicability test unit in the relay device of FIG. 1. FIG. 4 shows only related parts extracted from the configuration of FIG. 1 for the sake of convenience. A path between the user path terminal (first terminal) 24a in the frame processing unit 12 and the user path terminal 24b in the fabric interface unit 14 is referred to as a user path 40, and a path between the learning path terminal (second terminal) 25a in the frame processing unit 12 and the learning path terminal 25b in the fabric interface unit 14 is referred to as a FDB synchronization path 41.

The communicability test unit 20a in the processor unit 13 generates an intra-LC test [A] frame (second test frame) 35 at regular intervals. Then, the communicability test unit 20a transmits the intra-LC test [A] frame 35 to a fabric card selected by the path selection unit 23 (in this example, FC[2]) through the port interface unit 11, the user path terminal (first terminal) 24a, the user path 40 and the path selection unit 23.

The fabric card FC[2] transmits the received intra-LC test [A] frame 35 by return. This returned intra-LC test [A] frame 35 travels in a reverse direction along an outward path to reach the communicability test unit 20a in the processor unit 13. The communicability test unit 20a receives this returned intra-LC test [A] frame 35.

Also, the communicability test unit 20b in the frame processing unit 12 receives the intra-LC test [A] frame 35 on an outward path side and copies it to generate an intra-LC test [B] frame 36. Then, the communicability test unit 20b transmits the intra-LC test [B] frame 36 to the fabric card selected by the path selection unit 23 (in this case, FC[2]) through the learning path terminal (second terminal) 25a, the FDB synchronization path 41 and the path selection unit 23.

The fabric card FC[2] transmits the received intra-LC test [B] frame 36 by return. This returned intra-LC test [B] frame 36 reaches the communicability test unit 20b in the frame processing unit 12 through the same path as the outward path. The communicability test unit 20b receives the returned intra-LC test [B] frame 36. More specifically, the communicability test unit 20b generates the test frame (intra-LC test [B] frame 36) at every predetermined period (second period) and transmits and receives it through the learning path terminal (second terminal) 25a.

The predetermined period (second period) mentioned here is longer than the predetermined period (first period) associated with the switch of the fabric card FC described with reference to FIG. 3 and is not particularly limited, but is, for example, several hundred ms or longer. Since the fault of the FDB synchronization path 41 is less significant than the fault of the fabric path described with reference to FIG. 3, a relatively long interval can be set as the interval to generate the test frame (intra-LC test [B] frame 36) in this manner. As a result, the processing load can be reduced and the band occupancy in the FDB synchronization path 41 and the communication line 15 can be reduced.

The communicability test unit 20b evaluates the presence or absence of fault of its own line card LC (specifically, FDB synchronization path 41 therein) based on the reception result of the test frame (intra-LC test [B] frame 36) returned from the fabric card FC[2]. For example, the communicability test unit 20b determines that a fault is present if it cannot receive the intra-LC test [B] frame 36 for a period 3.5 times as long as the generation interval thereof (for example, several hundred ms or longer).

The communicability test unit 20a in the processor unit 13 also generates the test intra-LC test [A] frame 35 at every predetermined period (second period) like the case of the intra-LC test [B] frame 36. Then, the communicability test unit 20a evaluates the presence or absence of fault of its own line card LC (specifically, communication path on a side of the user path 40 therein) based on the reception result of the intra-LC test [A] frame 35 returned from the fabric card FC[2]. For example, the communicability test unit 20a determines that a fault is present if it cannot receive the intra-LC test [A] frame 35 for a period 3.5 times as long as the generation interval thereof (for example, several hundred ms or longer).

Note that, since the fault of the user path 40 is more significant than the fault of the FDB synchronization path 41, the generation interval of the intra-LC test [A] frame 35 can be made shorter than the generation interval of the intra-LC test [B] frame 36 depending on the situation. In this case, for example, it is sufficient if the communicability test unit 20b copies the received intra-LC test [A] frame 35 while appropriately culling it to generate the intra-LC test [B] frame 36.

Also, although the communicability test unit 20b copies the intra-LC test [A] frame 35 from the communicability test unit 20a to generate the intra-LC test [B] frame 36 in this case, the configuration in which the communicability test units 20a and 20b independently generate the test frame is also possible depending on the situation. However, by using the copy like the case of FIG. 4, the process of the communicability test unit 20b can be simplified, so that the processing load of the communicability test unit 20b can be reduced. Furthermore, it becomes possible to evaluate the presence or absence of fault in the port interface unit 11 based on whether the intra-LC test [A] frame 35 can be received by the communicability test unit 20b or not.

<<Intra-Line Card Test (Problem)>>

Figure 5:
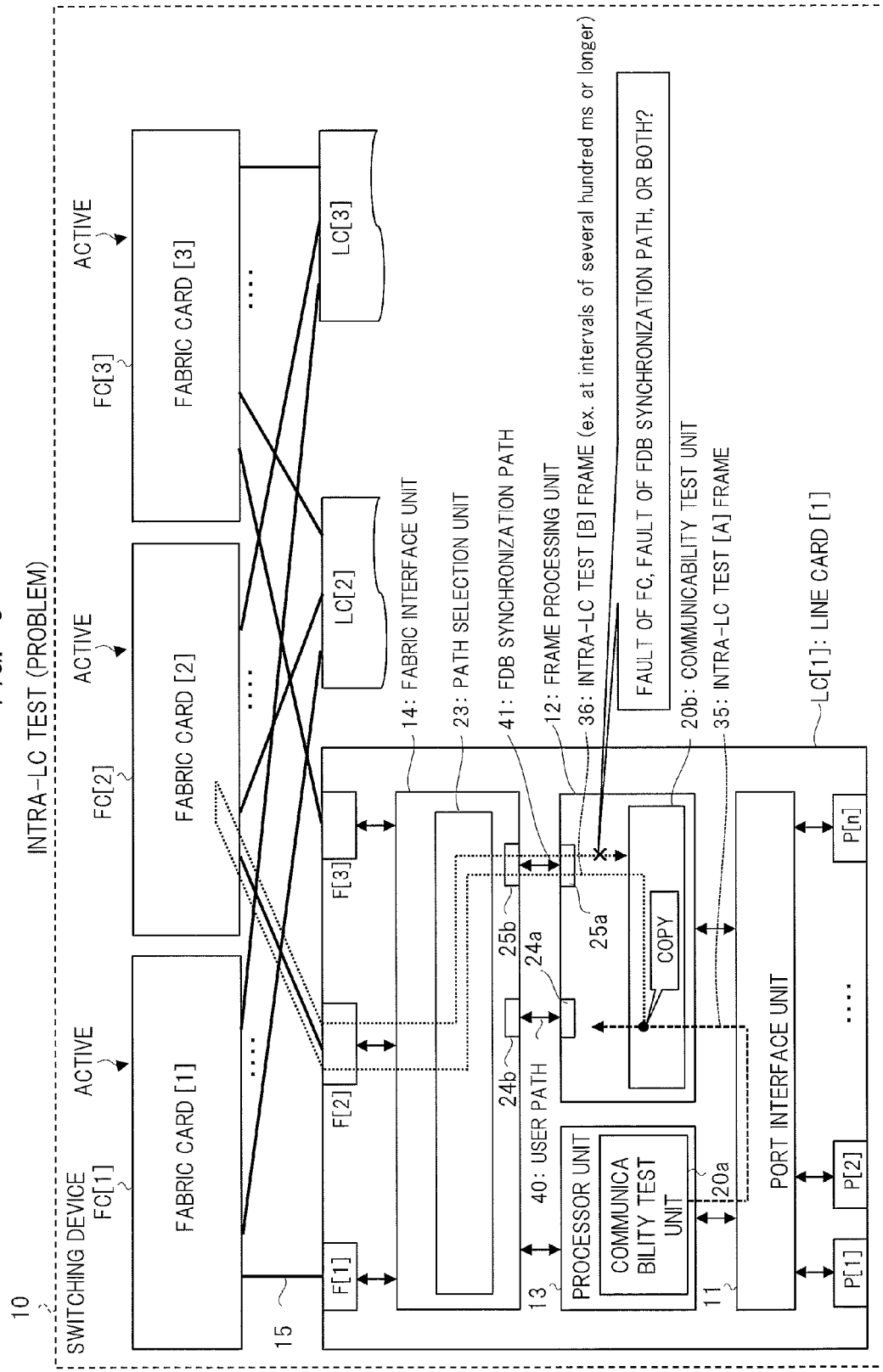
FIG. 5 is an explanatory drawing showing an example of a problem in the operation example of FIG. 4.

FIG. 5 is an explanatory drawing showing an example of a problem in the operation example of FIG. 4. FIG. 5 shows only a part of the transmission path of the intra-LC test [A] frame 35 with respect to FIG. 4 for the sake of convenience. In the case of using the operation example of FIG. 4, when the communicability test unit 20b in the frame processing unit 12 cannot receive the intra-LC test [B] frame 36 within a predetermined period, it is difficult to determine whether the cause thereof is in the fabric card FC, the FDB synchronization path 41 or both of them as shown in FIG. 5.

The communicability test unit 20b can detect the occurrence of fault in the fabric card FC through the fabric path monitoring unit 22 of FIG. 3 depending on the situation. However, since there is a possibility that the fault occurs also in the FDB synchronization path 41 in addition to the fabric card FC, even if the communicability test unit 20b receives the information from the fabric path monitoring unit 22, the communicability test unit 20b cannot determine the presence or absence of fault in the FDB synchronization path 41 in some cases.

The problem like this arises from the fact that the loop-back point of the intra-LC test [B] frame 36 is set in the fabric card FC. Here, if the loop-back point is set in the fabric interface unit 14, the problem like this can be avoided. In this case, however, there is the threat that the test efficiency is deteriorated. More specifically, in order to exhaustively test the overall switching device 10, it is desirable to test also the path reaching the fabric card FC, and this exhaustive test can be efficiently performed by performing the test shown in FIG. 4 to all of the line cards LC[1] to LC[m].

Furthermore, for example, in the case of the switching device 10 in which the relay of the user frame in the same line card LC (for example, relay between P[1] of LC[1] and P[n] of LC[1]) is performed through the fabric card FC, it is more beneficial to set the loop-back point in the fabric card FC. More specifically, in this case, since the test can be performed through the same path as the user frame, the reliability of the test can be enhanced, and since it is not necessary to separately provide the hardware corresponding to the loop-back point, the configuration can be simplified.

<<Intra-Line Card Test (Present Embodiment)>>

Figure 6:
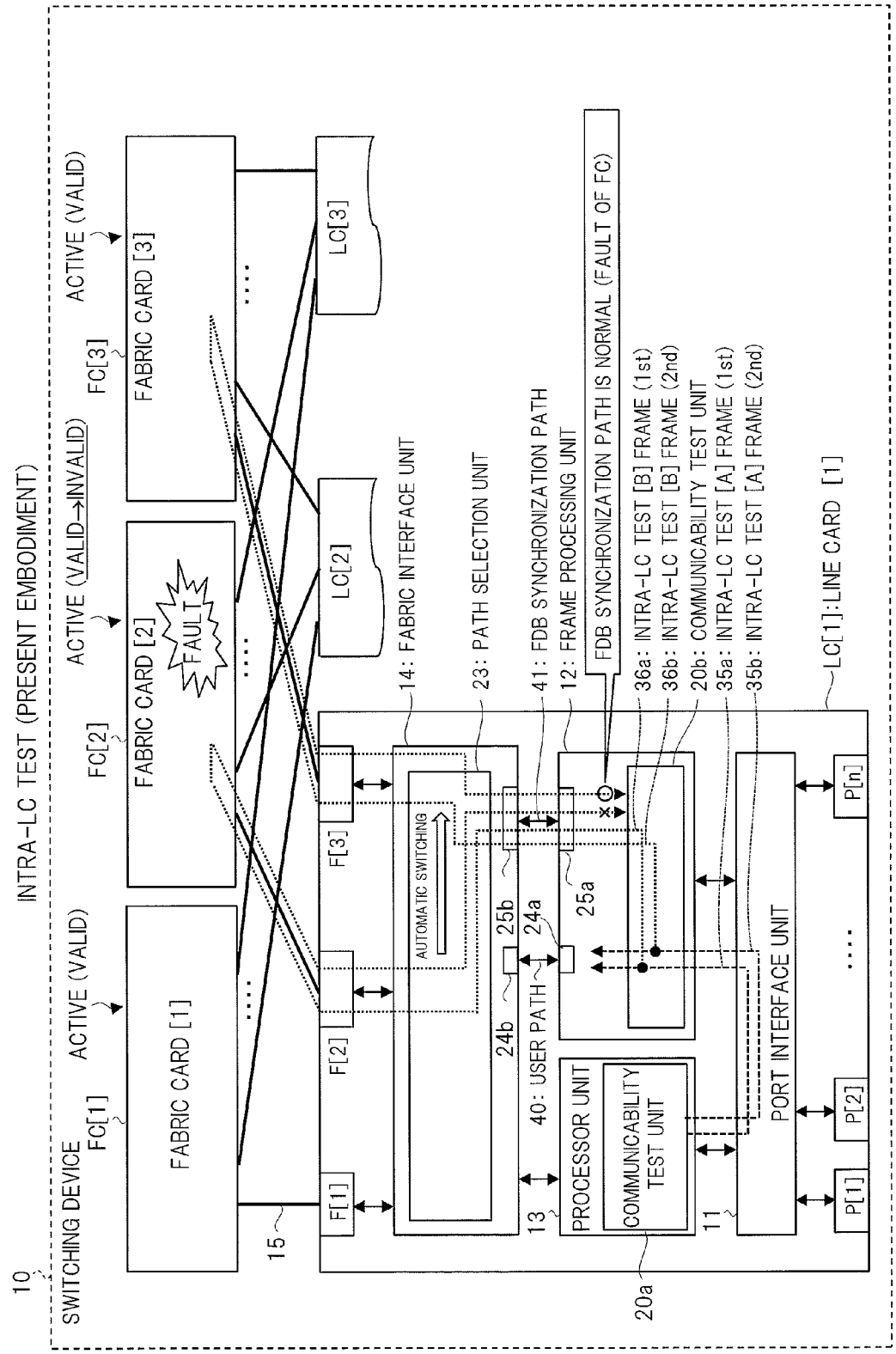
FIG. 6 is an explanatory drawing showing a schematic operation example of the communicability test unit in the relay device of FIG. 1.

FIG. 6 is an explanatory drawing showing a schematic operation example of the communicability test unit in the relay device of FIG. 1. The communicability test unit 20b in the frame processing unit 12 performs the process shown in FIG. 6 in order to solve the problem described with reference to FIG. 5. More specifically, the communicability test unit 20b evaluates the presence or absence of fault of its own line card LC (specifically, FDB synchronization path 41 therein) based on the reception result of an intra-LC test [B] frame 36a generated first and the reception result of an intra-LC test [B] frame 36b generated second after a predetermined period (second period).

For example, the case where a fault occurs in the fabric card (first fabric card) FC[2] and the communicability test unit 20b cannot receive the intra-LC test [B] frame 36a generated first due to the fault is assumed. In this case, before the communicability test unit 20b generates the second intra-LC test [B] frame 36b, the path selection unit 23 switches the frame transmitted to the fabric card FC[2] so as to be directed to another normal fabric card FC based on the monitoring result of the fabric path monitoring unit 22 described with reference to FIG. 3.

This normal fabric card (second fabric card) FC is the fabric card FC[1] or FC[3], and the case where the frame is directed to the fabric card FC[3] in accordance with the distribution rule at the time of the degraded operation by the path selection unit 23 is shown as an example here. As a result, the communicability test unit 20b can receive the intra-LC test [B] frame 36b generated second. On the other hand, if the fault occurs also in the FDB synchronization path 41, the communicability test unit 20b still cannot receive also the intra-LC test [B] frame 36b generated second.

In this manner, the communicability test unit 20b evaluates that its own line card LC (specifically, FDB synchronization path 41 therein) has no fault when the communicability test unit 20b cannot receive the intra-LC test [B] frame 36a generated first within a predetermined period and can receive the intra-LC test [B] frame 36b generated second within a predetermined period. On the other hand, the communicability test unit 20b evaluates that its own line card LC (specifically, FDB synchronization path 41 therein) has a fault when the communicability test unit 20b cannot receive both of the test frames generated first and second (intra-LC test [B] frames 36a and 36b) within a predetermined period.

As a result, the detection capability of the internal fault can be improved, and the improvement of the fault tolerance can be achieved. In the example of FIG. 6, the communicability test unit 20a in the processor unit 13 sequentially generates the first and second intra-LC test [A] frames 35a and 35b, and the communicability test unit 20b in the frame processing unit 12 sequentially copies the intra-LC test [A] frames 35a and 35b to generate the intra-LC test [B] frames 36a and 36b described above. However, as described with reference to FIG. 4, it is also possible to generate the intra-LC test [A] frame and the intra-LC test [B] frame at respectively different intervals.

Here, the fault evaluation method of the line card LC (specifically, FDB synchronization path 41) by the communicability test unit 20b using the test frames (intra-LC test [B] frames 36a and 36b) has been described. However, other than this, the similar method can be applied also to the fault evaluation method of the line card LC (specifically, communication path on a side of the user path 40) by the communicability test unit 20a using the test frames (intra-LC test [A] frames 35a and 35b).

<<Result Evaluation Process of Intra-Line Card Test>>

Figure 7:
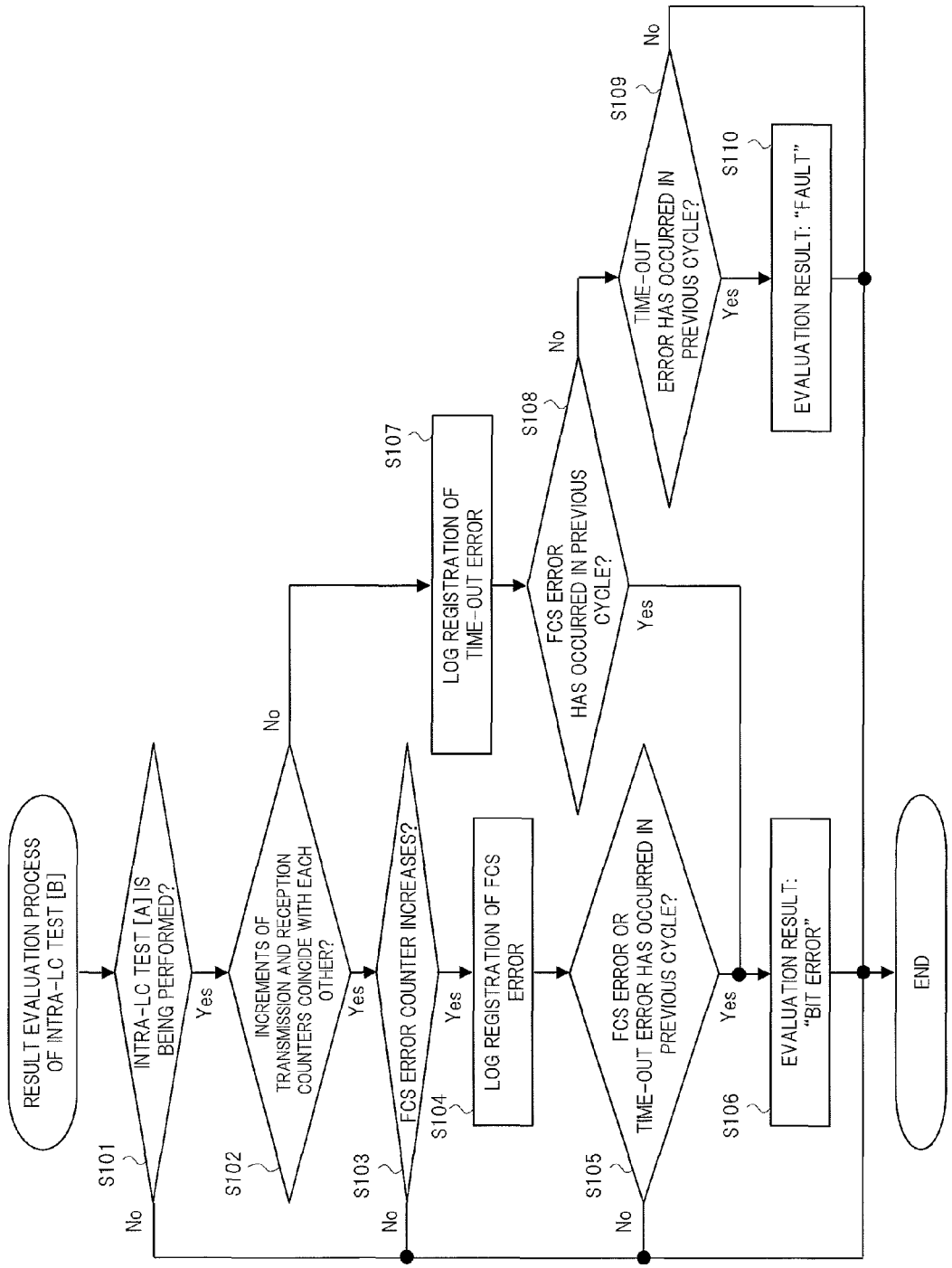
FIG. 7 is a flowchart showing an example of a result evaluation process associated with the intra-line card test of FIG. 6 in detail.

FIG. 7 is a flowchart showing an example of a result evaluation process associated with the intra-line card test of FIG. 6 in detail. In the result evaluation process of the intra-LC test [B] shown in FIG. 7, first, the communicability test unit 20b in the frame processing unit 12 determines whether the intra-LC test [A] using the intra-LC test [A] frame 35 is being performed (step S101). When the intra-LC test [A] is not being performed, the communicability test unit 20b finishes the process, and when it is being performed, the communicability test unit 20b determines whether the increments (difference from a previous test cycle) of the transmission and reception counters in the communicability test unit 20b coincide with each other (step S102).

The transmission counter counts up each time when the intra-LC test [B] frame 36 is transmitted, and the reception counter counts up each time when the intra-LC test [B] frame 36 is received within a predetermined period. Therefore, when the increments of the transmission and reception counters do not coincide with each other, this means that the intra-LC test [B] frame 36 which cannot be received (that is, reception time-out) is present.

The communicability test unit 20b determines whether a FCS error counter in the communicability test unit 20b increases from a previous test cycle or not when the increments of the transmission and reception counters coincide with each other in the step S102 (step S103). When the FCS error counter does not increase, the communicability test unit 20b finishes the process, and when the FCS error counter increases, the communicability test unit 20b registers the log of the FCS error (step S104). The FCS error is the error detected by an error detection code such as CRC (Cyclic Redundancy Check) contained in the intra-LC test [B] frame 36.

Subsequent to the step S104, the communicability test unit 20b determines whether the FCS error or the time-out error has occurred in the previous test cycle (step S105). When both of the FCS error and the time-out error have not occurred, the communicability test unit 20b finishes the process, and when either the FCS error or the time-out error has occurred, the communicability test unit 20b sets "bit error" as the evaluation result of the line card LC (specifically, FDB synchronization path 41 therein) (step S106).

On the other hand, when the increments of the transmission and reception counters do not coincide with each other in the step S102, the communicability test unit 20b registers the log of the time-out error (step S107). Next, the communicability test unit 20b determines whether the FCS error has occurred in the previous test cycle (step S108). When the FCS error has occurred, the communicability test unit 20b sets "bit error" as the evaluation result (step S106).

When the FCS error has not occurred in the step S108, the communicability test unit 20b determines whether the time-out error has occurred in the previous test cycle (step S109). When the time-out error has not occurred, the communicability test unit 20b finishes the process, and when the time-out error has occurred, the communicability test unit 20b sets "fault" as the evaluation result of the line card LC (specifically, FDB synchronization path 41 therein) (step S110).

As described above, when the error (FCS error or time-out error) has occurred in the reception result of the intra-LC test [B] frame 36, the communicability test unit 20b once registers the log (steps S104 and S107), and then generates an evaluation result based on the log and the reception result of the next intra-LC test [B] frame 36 (steps S106 and S110). In this example, when the error has occurred twice in a row and the errors are both time-out errors, the result is evaluated as "fault", and the result is evaluated as "bit error" in other cases.

Of course, the evaluation is not limited thereto, and the result may be evaluated as "fault" by a part or all of the conditions by which the result is evaluated as "bit error" in the case described above. Alternatively, it is also possible to evaluate the result as "fault" when the error has occurred three times in a row instead of twice in a row depending on the situation.

As described above, by using the relay device of the first embodiment, typically, the detection capability of the internal fault in the chassis-type switching device (relay device) can be improved, and the improvement of the fault tolerance can be achieved.

Second Embodiment

<<Communicability Test (Present Embodiment)>>

Figure 8:
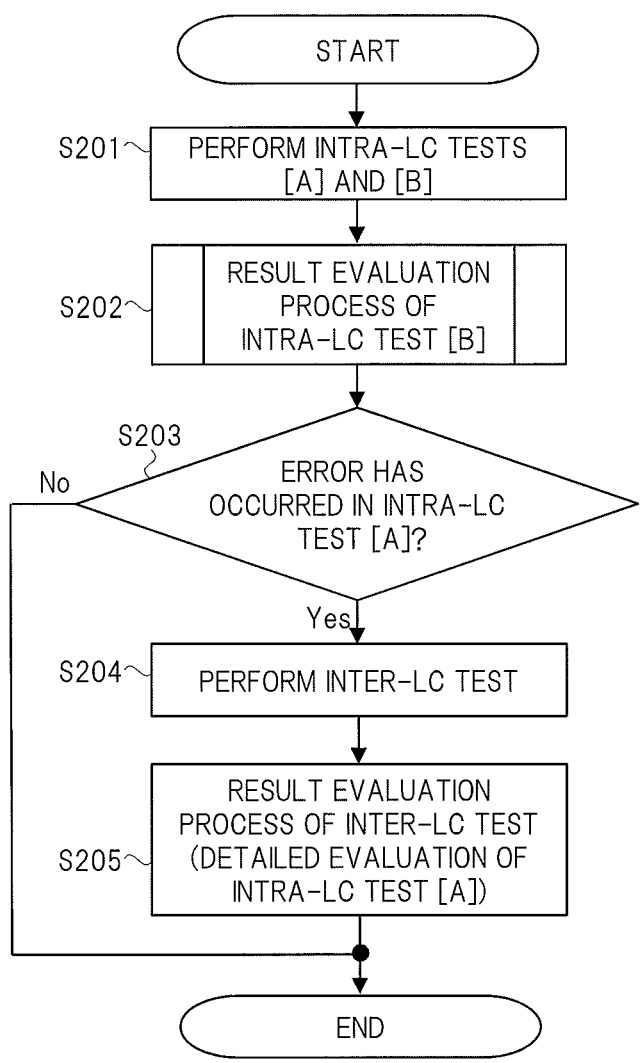
FIG. 8 is a flowchart showing an example of an overall sequence of the communicability test in a relay device according to the second embodiment of the present invention.

FIG. 8 is a flowchart showing an example of an overall sequence of the communicability test in a relay device according to the second embodiment of the present invention. In the first embodiment described above, the FDB synchronization path 41 is evaluated by the method shown in FIG. 6 and FIG. 7. Meanwhile, although the user path 40 can be evaluated by the same method as that shown in FIG. 6 and FIG. 7, the second embodiment is characterized in that the user path 40 is evaluated by another method. The configuration of the relay device of the second embodiment is the same as that of the switching device 10 shown in FIG. 1.

In FIG. 8, first, the communicability test unit 20a performs the intra-LC test [A] using the intra-LC test [A] frame 35, and the communicability test unit 20b performs the intra-LC test [B] using the intra-LC test [B] frame 36 as shown in FIG. 4 (step S201). Next, the communicability test unit 20b evaluates the presence or absence of fault of the line card LC (specifically, FDB synchronization path 41 therein) by performing the result evaluation process of the intra-LC test [B] shown in FIG. 7 (step S202).

On the other hand, the communicability test unit (second communicability test unit) 20a determines whether an error has occurred in the intra-LC test [A] (step S203). Concretely, the communicability test unit 20a determines whether it can receive the intra-LC test [A] frame (second test frame) 35 generated first by itself within a predetermined period. When the communicability test unit 20a can receive the intra-LC test [A] frame 35 generated first within a predetermined period, the communicability test unit 20a finishes the process, and performs the process of the step S201 again after the elapse of a predetermined period.

On the other hand, when the communicability test unit 20a cannot receive the intra-LC test [A] frame 35 generated first within a predetermined period, the communicability test unit 20a generates an inter-LC test frame (third test frame) for performing the communicability test with other line cards and performs an inter-LC test by using the frame (step S204). Next, the switching device (relay device) 10 performs the result evaluation process of the inter-LC test, thereby evaluating the intra-LC test [A] in detail (step S205). More specifically, the switching device 10 evaluates the presence or absence of fault in the communication path on a side of the user path 40 (in other words, path through the user path terminal (first terminal) 24a) in the line card LC based on the result of the inter-LC test (communicability test) using the inter-LC test frame.

<<Inter-Line Card Test>>

Figure 9:
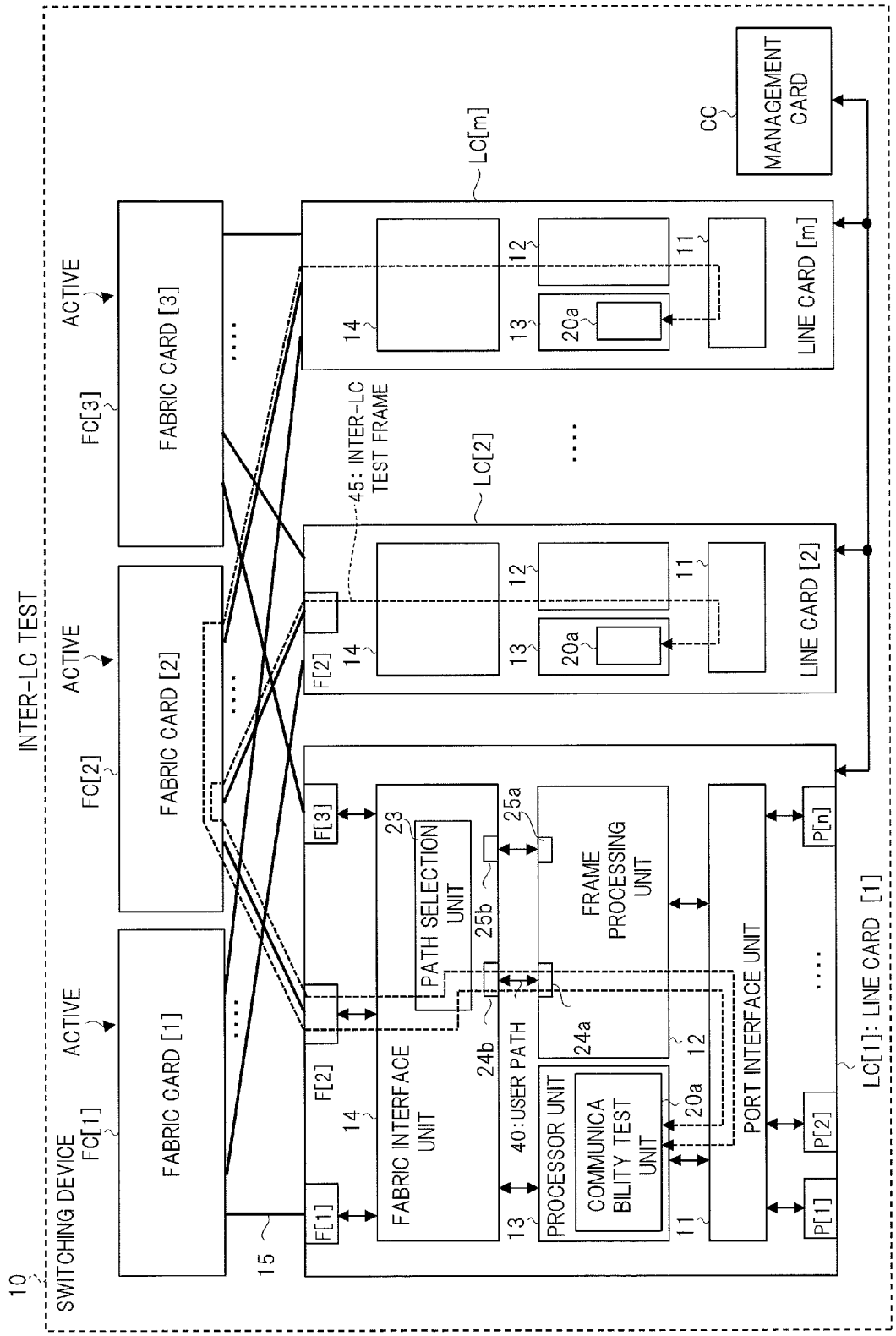
FIG. 9 is an explanatory drawing showing an example of an operation of the inter-line card test performed by the communicability test unit in FIG. 8.

FIG. 9 is an explanatory drawing showing an example of an operation of the inter-line card test performed by the communicability test unit in FIG. 8. FIG. 9 shows only related parts extracted from the configuration of FIG. 1 for the sake of convenience. In the example shown in FIG. 9, the communicability test unit 20a of the line card LC[1] transmits an inter-LC test frame 45 to each of the communicability test units 20a of the line cards LC[2] to LC[m] through the fabric card (in this case, FC[2]). Also, the communicability test unit 20a of the line card LC[1] receives the inter-LC test frame 45 generated by each of the communicability test units 20a of the line cards LC[2] to LC[m] through the fabric card (in this case, FC[2]).

<<Result Evaluation Process of Inter-Line Card Test>>

By performing the inter-LC test shown in FIG. 9, for example, the result of the inter-LC test as shown in FIG. 10 can be obtained. FIG. 10 is an explanatory drawing showing an example of a result evaluation process associated with the inter-line card test in FIG. 8. FIG. 10 shows an example of the result in the case where the inter-LC test is performed mutually between all of the line cards LC[1] to LC[m]. In the example of FIG. 10, any of the line cards LC[2] to LC[m] cannot receive the inter-LC test frame 45 from the line card LC[1]. Therefore, in this case, it is possible to determine that the path in one direction (path in the direction toward the fabric card FC) in the communication paths on a side of the user path 40 in the line card LC[1] has a fault. In FIG. 10, "TRANSMISSION CARD" indicates line cards which have transmitted the inter-LC test frame and "RECEIVED CARD" indicates line cards which have received the inter-LC test frame.

Also, in the inter-LC test, it is possible to specify the fabric card FC through which the frame passes. Therefore, by comparing the results of the inter-LC tests between the fabric cards FC through which the frame passes, the fault on a side of the fabric card FC and the fault on a side of the line card LC can be separately evaluated. Though not particularly limited, the result evaluation process of the inter-LC test shown in FIG. 10 is performed by the management card CC.

By performing the inter-LC test like this, the state of fault can be accurately comprehended by reference to "○" and "X" shown in FIG. 10. Therefore, with respect to the communication path on a side of the user path 40, it is beneficial to perform the inter-LC test when the error has occurred in the intra-LC test [A]. Similarly, the inter-LC test may be performed also when the error has occurred in the intra-LC test [B]. However, since the processing load of the inter-LC test is large and the inter-LC test leads to the increase of the occupancy of communication band, it is desirable not to perform the inter-LC test as much as possible. Furthermore, it can be said that the fault of the FDB synchronization path 41 is less significant than the fault of the user path 40. From these perspectives, it is beneficial to evaluate the intra-LC test [B] by the method described with reference to FIG. 7 without performing the inter-LC test.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A relay device comprising:

a plurality of line cards which communicates a frame with outside; and first and second fabric cards which relay a frame between the plurality of line cards, wherein each of the plurality of line cards includes:

an external port;

a frame processing unit which, when a frame is received at the external port, learns an address table and retrieves a destination of the frame based on the address table;

a fabric path monitoring unit which monitors communicability between its own line card and the first and second fabric cards, and when there is abnormality in the communicability with the first fabric card, detects the abnormality and configures settings to switch a frame transmitted to the first fabric card so as to be directed to the second fabric card as a result of the detection of the abnormality within a first period;

a path selection unit which selects a fabric card based on the settings of the fabric path monitoring unit and transmits a frame to the selected fabric card;

a first communicability test unit of the line card which generates a test frame at every second period, transmits the generated test frame to the fabric card selected by the path selection unit through the path selection unit, the fabric card transmits the received test frame by return to the line card, and the first communicability test unit receives the test frame returned from the fabric card; and a second communicability test unit which generates a second test frame at regular intervals, transmits the second test frame to the fabric card selected by the path selection unit through the first terminal and the path selection unit, and receives the second test frame returned from the fabric card, the second period is longer than the first period, the first communicability test unit evaluates presence or absence of fault in its own line card based on a reception result for the test frame generated first and a reception result for the test frame generated second after an elapse of the second period, wherein the first communicability test unit evaluates that its own line card has no fault when the first communicability test unit cannot receive the test frame generated first within a predetermined period and can receive the test frame generated second within a predetermined period, and evaluates that its own line card has a fault when the first communicability test unit cannot receive both of the test frames generated first and second within a predetermined period, wherein the first communicability test unit is provided in the frame processing unit, the frame processing unit further includes:

first and second terminals to connect the frame processing unit and the path selection unit; and an address table synchronization unit which generates a learning frame to reflect update information of its own address table on other line cards, the first terminal is a terminal which transmits a frame received at the external port of its own line card to another line card and receives a frame received at the external port of another line card and transmitted from another line card, the second terminal is a terminal which transmits the learning frame generated in its own line card and receives the learning frame generated in another line card, and the first communicability test unit transmits and receives the test frame through the second terminal, and wherein the first communicability test unit in the frame processing unit transmits and receives the test frame generated by receiving the second test frame and copying the second test frame through the second terminal, thereby evaluating presence or absence of a fault of a path running through the second terminal.

2. The relay device according to claim 1, wherein, when the second communicability test unit cannot receive the second test frame generated first by itself within a predetermined period, it generates a third test frame for performing a communicability test with another line card, and the relay device evaluates presence or absence of a fault of a path running through the first terminal based on a result of a communicability test using the third test frame.

* * * * *